United States Patent
Thomas et al.

(10) Patent No.: US 12,505,693 B2
(45) Date of Patent: Dec. 23, 2025

(54) METHOD AND SYSTEM FOR TREE-BASED TEXT REPRESENTATION AND COMPARISON

(71) Applicant: JPMorgan Chase Bank, N.A., New York, NY (US)

(72) Inventors: Nancy Thomas, New York, NY (US); Daniel Borrajo, Pozuelo de Alarcon (ES)

(73) Assignee: JPMORGAN CHASE BANK, N.A., New York, NY (US)

( * ) Notice: Subject to any disclaimer, the term of this patent is extended or adjusted under 35 U.S.C. 154(b) by 261 days.

(21) Appl. No.: 18/124,392

(22) Filed: Mar. 21, 2023

(65) Prior Publication Data
US 2024/0320995 A1    Sep. 26, 2024

(51) Int. Cl.
G06V 30/414    (2022.01)
G06F 40/137    (2020.01)
G06F 40/14     (2020.01)
G06F 40/194    (2020.01)
G06F 40/205    (2020.01)

(52) U.S. Cl.
CPC .......... *G06V 30/414* (2022.01); *G06F 40/137* (2020.01); *G06F 40/14* (2020.01); *G06F 40/194* (2020.01); *G06F 40/205* (2020.01)

(58) Field of Classification Search
CPC .... G06F 40/194; G06F 40/205; G06F 40/137; G06F 40/14
See application file for complete search history.

(56) References Cited

U.S. PATENT DOCUMENTS

| | | | | |
|---|---|---|---|---|
| 5,956,726 A | * | 9/1999 | Aoyama | G06F 16/81 715/236 |
| 6,560,620 B1 | * | 5/2003 | Ching | G06V 30/416 707/999.203 |
| 6,931,590 B2 | * | 8/2005 | Kanie | G06F 40/143 715/256 |
| 10,169,353 B1 | * | 1/2019 | Riley | G06F 16/148 |
| 10,558,737 B2 | * | 2/2020 | Rix | G06F 40/14 |
| 10,599,722 B1 | * | 3/2020 | Ewing | G06F 16/93 |
| 2003/0237047 A1 | * | 12/2003 | Borson | G06F 40/194 707/999.203 |

(Continued)

*Primary Examiner* — Samuel G Neway
(74) *Attorney, Agent, or Firm* — Greenblum & Bernstein, P.L.C.

(57) ABSTRACT

A method for facilitating electronic textual representation and comparison is disclosed. The method includes receiving, via a graphical user interface, a comparison request that includes a first electronic document and a second electronic document; parsing the first electronic document and the second electronic document to classify textual data; generating, by using the classified textual data, a first tree structure for the first electronic document and a second tree structure for the second electronic document; constructing a first hierarchy dictionary for the first tree structure and a second hierarchy dictionary for the second tree structure; determining differences between the first electronic document and the second electronic document by using the first tree structure, the first hierarchy dictionary, the second tree structure, and the second hierarchy dictionary; and generating graphical representations that depicts the differences and textual representations that summarize the differences.

16 Claims, 5 Drawing Sheets

(56) References Cited

U.S. PATENT DOCUMENTS

| | | | |
|---|---|---|---|
| 2008/0250357 A1* | 10/2008 | Lee | G06F 40/14 |
| | | | 715/853 |
| 2010/0138415 A1* | 6/2010 | Lein | G06F 16/9027 |
| | | | 707/E17.014 |
| 2012/0016867 A1* | 1/2012 | Clemm | G06F 40/197 |
| | | | 707/769 |
| 2014/0032513 A1* | 1/2014 | Gaither | G06F 16/90344 |
| | | | 707/698 |
| 2014/0033123 A1* | 1/2014 | Hockmann | G06F 8/65 |
| | | | 715/810 |
| 2016/0188584 A1* | 6/2016 | Glover | G06F 16/285 |
| | | | 707/608 |
| 2019/0286741 A1* | 9/2019 | Agarwal | G06F 40/197 |
| 2023/0289526 A1* | 9/2023 | Thukral | G06F 40/205 |
| 2024/0320995 A1* | 9/2024 | Thomas | G06F 40/205 |

* cited by examiner

METHOD AND SYSTEM FOR TREE-BASED TEXT REPRESENTATION AND COMPARISON

BACKGROUND

1. Field of the Disclosure

This technology generally relates to methods and systems for text representation, and more particularly to methods and systems for facilitating contextual and structural comparisons of electronic texts via tree-based processing to capture differences and provide structured representations.

2. Background Information

Many business entities rely on information such as, for example, constraint information that is provided electronically via documents such as, for example, prospectus documents to facilitate business operations and provide services for users. Often, these expansive electronic documents are regularly updated with new information that must be quickly identified, extracted, and contextualized. Historically, implementations of conventional text representation and comparison techniques have resulted in varying degrees of success with respect to effectiveness and efficiency.

One drawback of using the conventional text representation and comparison techniques is that in many instances, natural language data in the electronic documents are not represented contextually by computing components. As a result, structural changes to the electronic documents as well as modification actions such as, for example, text addition actions and text removal actions at sectional levels are not adequately captured. Additionally, by merely comparing natural language data in a one-to-one manner, the conventional text representation and comparison techniques are not able to granularly summarize changes to the electronic documents.

Therefore, there is a need to provide contextual and structural comparisons of electronic texts via tree-based processing to capture differences and provide structured representations.

SUMMARY

The present disclosure, through one or more of its various aspects, embodiments, and/or specific features or sub-components, provides, inter alia, various systems, servers, devices, methods, media, programs, and platforms for facilitating contextual and structural comparisons of electronic texts via tree-based processing to capture differences and provide structured representations.

According to an aspect of the present disclosure, a method for facilitating electronic textual representation and comparison via tree-based structures and algorithms is disclosed. The method is implemented by at least one processor. The method may include receiving, via a graphical user interface, at least one comparison request, each of the at least one comparison request may include a first electronic document and a second electronic document; parsing the first electronic document and the second electronic document to classify textual data; generating, by using the classified textual data, a first tree structure that corresponds to the first electronic document and a second tree structure that corresponds to the second electronic document; constructing a first hierarchy dictionary that corresponds to the first tree structure and a second hierarchy dictionary that corresponds to the second tree structure; determining at least one difference between the first electronic document and the second electronic document by using the first tree structure, the first hierarchy dictionary, the second tree structure, and the second hierarchy dictionary; and generating at least one graphical representation that depicts the at least one difference and at least one textual representation that summarizes the at least one difference.

In accordance with an exemplary embodiment, the at least one comparison request may include instructions to compare the first electronic document with the second electronic document, the first electronic document and the second electronic document may include data in a natural language format.

In accordance with an exemplary embodiment, the first tree structure may relate to a first structural hierarchy that represents the first electronic document, the first structural hierarchy may include a plurality of first linguistic components; and wherein the second tree structure may relate to a second structural hierarchy that represents the second electronic document, the second structural hierarchy may include a plurality of second linguistic components.

In accordance with an exemplary embodiment, the at least one difference may include a type of change that corresponds to at least one from among a document structure and a document text, the type of change may include at least one from among a modification change, an addition change, a removal change, an addition with all descendants change, a removal with all descendants change, an order swap change, a parent change, and a modify and reorder change.

In accordance with an exemplary embodiment, to classify the textual data, the method may further include extracting the textual data and at least one corresponding textual characteristic from the first electronic document and from the second electronic document; determining, by using a predefined rule, an attribute for each of a plurality of textual components of the textual data based on the corresponding textual characteristic; consecutively merging the plurality of textual components into at least one text block based on a similarity of the attribute; and assigning a label to each of the at least one text block based on the corresponding attribute.

In accordance with an exemplary embodiment, to generate the first tree structure and the second tree structure, the method may further include initializing at least one node based on a quantity of the at least one text block; linking each of the at least one node to each of the at least one text block; and categorizing each of the at least one node based on a predetermined guideline and the corresponding label, the predetermined guideline may relate to a parent and child classification.

In accordance with an exemplary embodiment, to construct the first hierarchy dictionary and the second hierarchy dictionary, the method may further include assigning a header type to the attribute linked to at least one uncategorized node; building a dictionary that includes merging rules for a plurality of different header types, the dictionary may relate to the first hierarchy dictionary and the second hierarchy dictionary; and iteratively cataloging, by using the header type, each of the at least one uncategorized node based on the dictionary.

In accordance with an exemplary embodiment, to determine the at least one difference, the method may further include iteratively performing a breadth first search through both the first tree structure and the second tree structure; identifying, by using the breadth first search, at least one matching pair of nodes from the first tree structure and the second tree structure based on a similarity score and a predetermined threshold; and appending, by the at least one processor, the at least one matching pair in a queue.

In accordance with an exemplary embodiment, the method may further include identifying, by using the breadth first search, at least one partially matching pair of nodes from the first tree structure and the second tree structure based on the similarity score and a predetermined threshold; tagging the at least one partially matching pair; and appending, by the at least one processor, the at least one partially matching pair together with the tag in the queue.

According to an aspect of the present disclosure, a computing device configured to implement an execution of a method for facilitating electronic textual representation and comparison via tree-based structures and algorithms is disclosed. The computing device including a processor; a memory; and a communication interface coupled to each of the processor and the memory, wherein the processor may be configured to receive, via a graphical user interface, at least one comparison request, each of the at least one comparison request may include a first electronic document and a second electronic document; parse the first electronic document and the second electronic document to classify textual data; generate, by using the classified textual data, a first tree structure that corresponds to the first electronic document and a second tree structure that corresponds to the second electronic document; construct a first hierarchy dictionary that corresponds to the first tree structure and a second hierarchy dictionary that corresponds to the second tree structure; determine at least one difference between the first electronic document and the second electronic document by using the first tree structure, the first hierarchy dictionary, the second tree structure, and the second hierarchy dictionary; and generate at least one graphical representation that depicts the at least one difference and at least one textual representation that summarizes the at least one difference.

In accordance with an exemplary embodiment, the at least one comparison request may include instructions to compare the first electronic document with the second electronic document, the first electronic document and the second electronic document may include data in a natural language format.

In accordance with an exemplary embodiment, the first tree structure may relate to a first structural hierarchy that represents the first electronic document, the first structural hierarchy may include a plurality of first linguistic components; and wherein the second tree structure may relate to a second structural hierarchy that represents the second electronic document, the second structural hierarchy may include a plurality of second linguistic components.

In accordance with an exemplary embodiment, the at least one difference may include a type of change that corresponds to at least one from among a document structure and a document text, the type of change may include at least one from among a modification change, an addition change, a removal change, an addition with all descendants change, a removal with all descendants change, an order swap change, a parent change, and a modify and reorder change.

In accordance with an exemplary embodiment, to classify the textual data, the processor may be further configured to extract the textual data and at least one corresponding textual characteristic from the first electronic document and from the second electronic document; determine, by using a predefined rule, an attribute for each of a plurality of textual components of the textual data based on the corresponding textual characteristic; consecutively merge the plurality of textual components into at least one text block based on a similarity of the attribute; and assign a label to each of the at least one text block based on the corresponding attribute.

In accordance with an exemplary embodiment, to generate the first tree structure and the second tree structure, the processor may be further configured to initialize at least one node based on a quantity of the at least one text block; link each of the at least one node to each of the at least one text block; and categorize each of the at least one node based on a predetermined guideline and the corresponding label, the predetermined guideline may relate to a parent and child classification.

In accordance with an exemplary embodiment, to construct the first hierarchy dictionary and the second hierarchy dictionary, the processor may be further configured to assign a header type to the attribute linked to at least one uncategorized node; build a dictionary that includes merging rules for a plurality of different header types, the dictionary may relate to the first hierarchy dictionary and the second hierarchy dictionary; and iteratively catalog, by using the header type, each of the at least one uncategorized node based on the dictionary.

In accordance with an exemplary embodiment, to determine the at least one difference, the processor may be further configured to iteratively perform a breadth first search through both the first tree structure and the second tree structure; identify, by using the breadth first search, at least one matching pair of nodes from the first tree structure and the second tree structure based on a similarity score and a predetermined threshold; and append the at least one matching pair in a queue.

In accordance with an exemplary embodiment, the processor may be further configured to identify, by using the breadth first search, at least one partially matching pair of nodes from the first tree structure and the second tree structure based on the similarity score and the predetermined threshold; tag the at least one partially matching pair; and append the at least one partially matching pair together with the tag in the queue.

According to an aspect of the present disclosure, a non-transitory computer readable storage medium storing instructions for facilitating electronic textual representation and comparison via tree-based structures and algorithms is disclosed. The storage medium including executable code which, when executed by a processor, may cause the processor to receive, via a graphical user interface, at least one comparison request, each of the at least one comparison request may include a first electronic document and a second electronic document; parse the first electronic document and the second electronic document to classify textual data; generate, by using the classified textual data, a first tree structure that corresponds to the first electronic document and a second tree structure that corresponds to the second electronic document; construct a first hierarchy dictionary that corresponds to the first tree structure and a second hierarchy dictionary that corresponds to the second tree structure; determine at least one difference between the first electronic document and the second electronic document by using the first tree structure, the first hierarchy dictionary, the second tree structure, and the second hierarchy dictionary; and generate at least one graphical representation that depicts the at least one difference and at least one textual representation that summarizes the at least one difference.

In accordance with an exemplary embodiment, the at least one comparison request may include instructions to compare the first electronic document with the second electronic document, the first electronic document and the second electronic document may include data in a natural language format.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
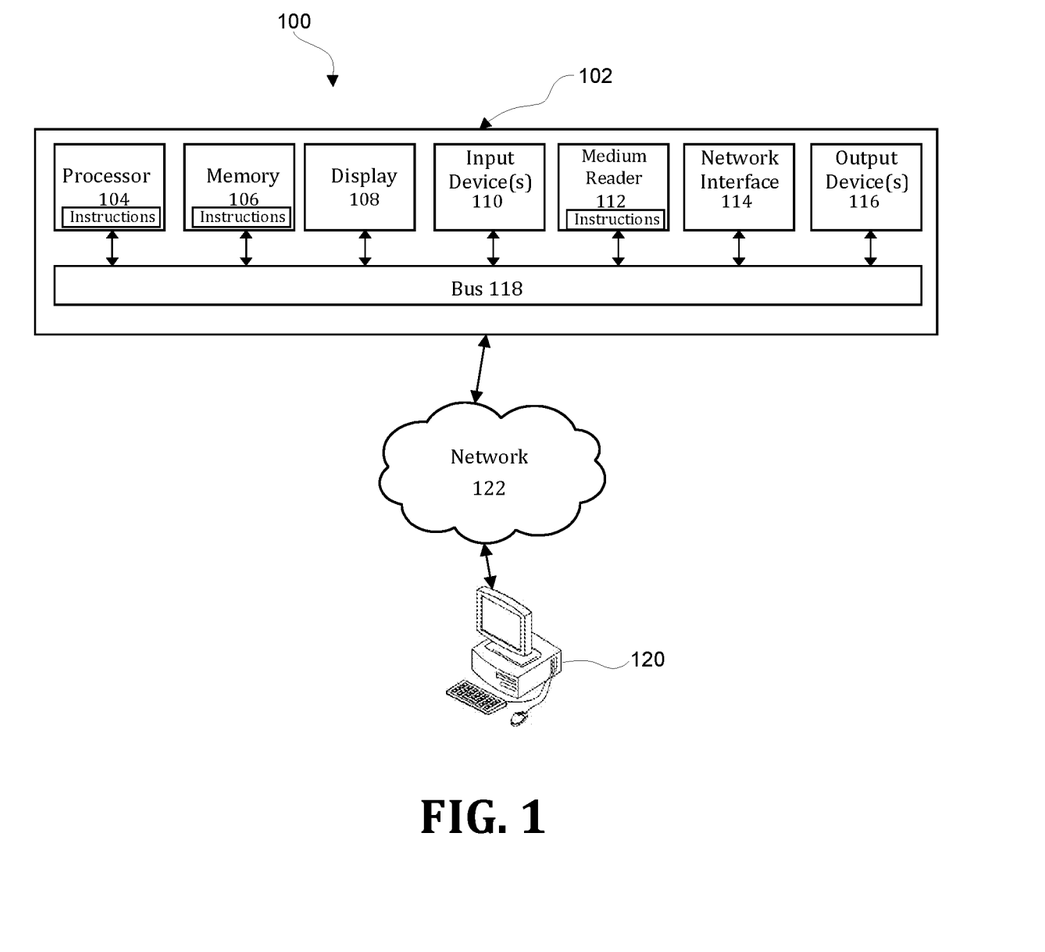
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, bluray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth, Zigbee, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating contextual and structural comparisons of electronic texts via tree-based processing to capture differences and provide structured representations.

Figure 2:
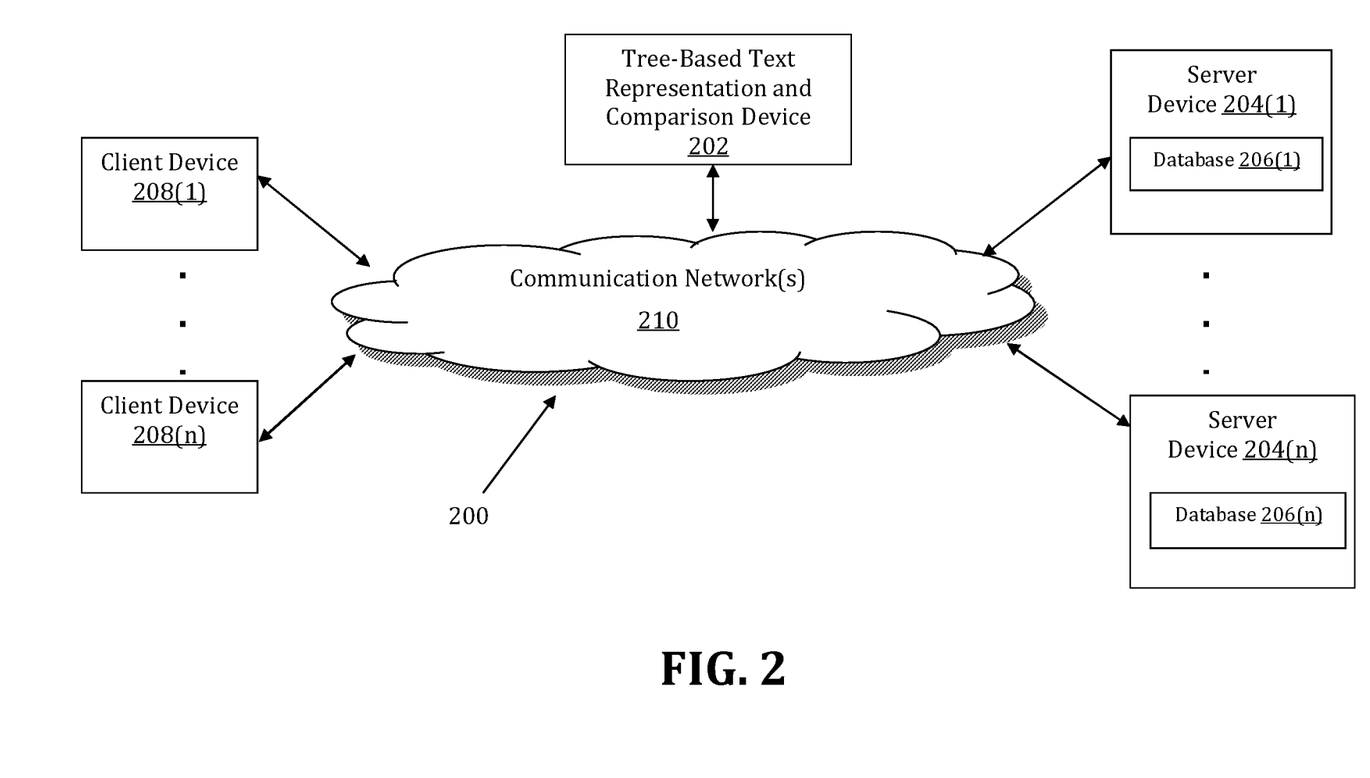
FIG. 2 illustrates an exemplary diagram of a network environment.

Referring to FIG. 2, a schematic of an exemplary network environment 200 for implementing a method for facilitating contextual and structural comparisons of electronic texts via tree-based processing to capture differences and provide structured representations is illustrated. In an exemplary embodiment, the method is executable on any networked computer platform, such as, for example, a personal computer (PC).

The method for facilitating contextual and structural comparisons of electronic texts via tree-based processing to capture differences and provide structured representations may be implemented by a Tree-Based Text Representation and Comparison (TBTRC) device 202. The TBTRC device 202 may be the same or similar to the computer system 102 as described with respect to FIG. 1. The TBTRC device 202 may store one or more applications that can include executable instructions that, when executed by the TBTRC device 202, cause the TBTRC device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TBTRC device 202 itself, may be located in virtual server(s) running in a cloud-based computing environment rather than being tied to one or more specific physical network computing devices. Also, the application(s) may be running in one or more virtual machines (VMs) executing on the TBTRC device 202. Additionally, in one or more embodiments of this technology, virtual machine(s) running on the TBTRC device 202 may be managed or supervised by a hypervisor.

In the network environment 200 of FIG. 2, the TBTRC device 202 is coupled to a plurality of server devices 204(1)-204(n) that hosts a plurality of databases 206(1)-206(n), and also to a plurality of client devices 208(1)-208(n) via communication network(s) 210. A communication interface of the TBTRC device 202, such as the network interface 114 of the computer system 102 of FIG. 1, operatively couples and communicates between the TBTRC device 202, the server devices 204(1)-204(n), and/or the client devices 208(1)-208(n), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TBTRC device 202, the server devices 204(1)-204(n), and/or the client devices 208(1)-208(n) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and TBTRC devices that efficiently implement a method for facilitating contextual and structural comparisons of electronic texts via tree-based processing to capture differences and provide structured representations.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TBTRC device 202 may be a standalone device or integrated with one or more other devices or apparatuses, such as one or more of the server devices 204(1)-204(n), for example. In one particular example, the TBTRC device 202 may include or be hosted by one of the server devices 204(1)-204(n), and other arrangements are also possible. Moreover, one or more of the devices of the TBTRC device 202 may be in a same or a different communication network including one or more public, private, or cloud networks, for example.

The plurality of server devices 204(1)-204(n) may be the same or similar to the computer system 102 or the computer device 120 as described with respect to FIG. 1, including any features or combination of features described with respect thereto. For example, any of the server devices 204(1)-204(n) may include, among other features, one or more processors, a memory, and a communication interface, which are coupled together by a bus or other communication link, although other numbers and/or types of network devices may be used. The server devices 204(1)-204(n) in this example may process requests received from the TBTRC device 202 via the communication network(s) 210 according to the HTTP-based and/or JavaScript Object Notation (JSON) protocol, for example, although other protocols may also be used.

The server devices 204(1)-204(n) may be hardware or software or may represent a system with multiple servers in a pool, which may include internal or external networks. The server devices 204(1)-204(n) hosts the databases 206(1)-206(n) that are configured to store data that relates to comparison requests, electronic documents, textual data, tree structures, structural hierarchy dictionaries, differences, graphical representations, visual representations, tags, and labels.

Although the server devices 204(1)-204(n) are illustrated as single devices, one or more actions of each of the server devices 204(1)-204(n) may be distributed across one or more distinct network computing devices that together comprise one or more of the server devices 204(1)-204(n). Moreover, the server devices 204(1)-204(n) are not limited to a particular configuration. Thus, the server devices 204(1)-204(n) may contain a plurality of network computing devices that operate using a controller/agent approach, whereby one of the network computing devices of the server devices 204(1)-204(n) operates to manage and/or otherwise coordinate operations of the other network computing devices.

The server devices 204(1)-204(n) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(n) may also be the same or similar to the computer system 102 or the computer device 120 as described with respect to FIG. 1, including any features or combination of features described with respect thereto. For example, the client devices 208(1)-208(n) in this example may include any type of computing device that can interact with the TBTRC device 202 via communication network(s) 210. Accordingly, the client devices 208(1)-208(n) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(n) may run interface applications, such as standard web browsers or standalone client applications, which may provide an interface to communicate with the TBTRC device 202 via the communication network(s) 210 in order to communicate user requests and information. The client devices 208(1)-208(n) may further include, among other features, a display device, such as a display screen or touchscreen, and/or an input device, such as a keyboard, for example.

Although the exemplary network environment 200 with the TBTRC device 202, the server devices 204(1)-204(n), the client devices 208(1)-208(n), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TBTRC device 202, the server devices 204(1)-204(n), or the client devices 208(1)-208(n), for example, may be configured to operate as virtual instances on the same physical machine. In other words, one or more of the TBTRC device 202, the server devices 204(1)-204(n), or the client devices 208(1)-208(n) may operate on the same physical device rather than as separate devices communicating through communication network(s) 210. Additionally, there may be more or fewer TBTRC devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
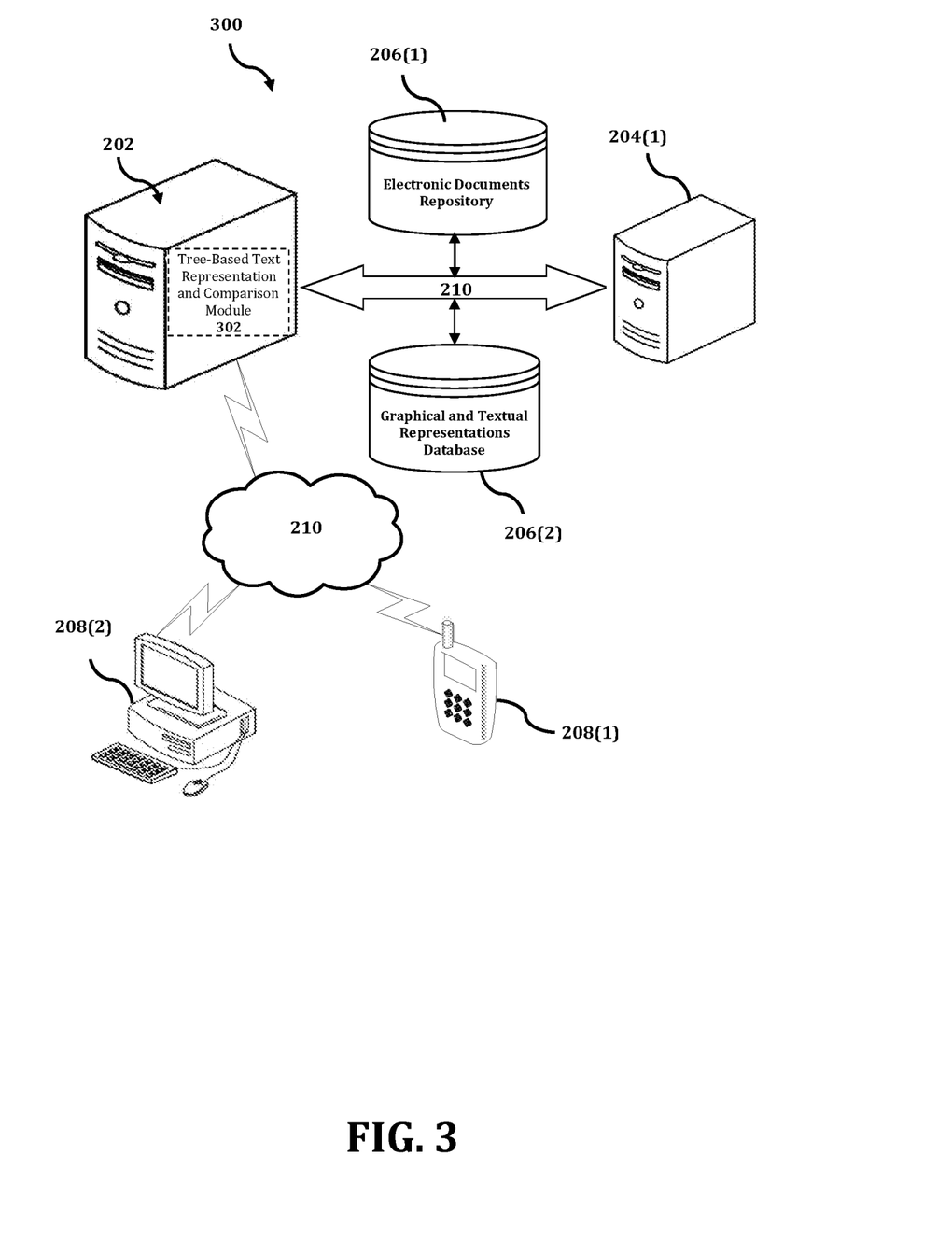
FIG. 3 shows an exemplary system for implementing a method for facilitating contextual and structural comparisons of electronic texts via tree-based processing to capture differences and provide structured representations.

The TBTRC device 202 is described and shown in FIG. 3 as including a tree-based text representation and comparison module 302, although it may include other rules, policies, modules, databases, or applications, for example. As will be described below, the tree-based text representation and comparison module 302 is configured to implement a method for facilitating contextual and structural comparisons of electronic texts via tree-based processing to capture differences and provide structured representations.

An exemplary process 300 for implementing a mechanism for facilitating contextual and structural comparisons of electronic texts via tree-based processing to capture differences and provide structured representations by utilizing the network environment of FIG. 2 is shown as being executed in FIG. 3. Specifically, a first client device 208(1) and a second client device 208(2) are illustrated as being in communication with TBTRC device 202. In this regard, the first client device 208(1) and the second client device 208(2) may be "clients" of the TBTRC device 202 and are described herein as such. Nevertheless, it is to be known and understood that the first client device 208(1) and/or the second client device 208(2) need not necessarily be "clients" of the TBTRC device 202, or any entity described in association therewith herein. Any additional or alternative relationship may exist between either or both of the first client device 208(1) and the second client device 208(2) and the TBTRC device 202, or no relationship may exist.

Further, TBTRC device 202 is illustrated as being able to access an electronic documents repository 206(1) and a graphical and textual representations database 206(2). The tree-based text representation and comparison module 302 may be configured to access these databases for implementing a method for facilitating contextual and structural comparisons of electronic texts via tree-based processing to capture differences and provide structured representations.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the TBTRC device 202 via broadband or cellular communication. Of course, these embodiments are merely exemplary and are not limiting or exhaustive.

Upon being started, the tree-based text representation and comparison module 302 executes a process for facilitating contextual and structural comparisons of electronic texts via tree-based processing to capture differences and provide structured representations. An exemplary process for facilitating contextual and structural comparisons of electronic texts via tree-based processing to capture differences and provide structured representations is generally indicated at flowchart 400 in FIG. 4.

Figure 4:
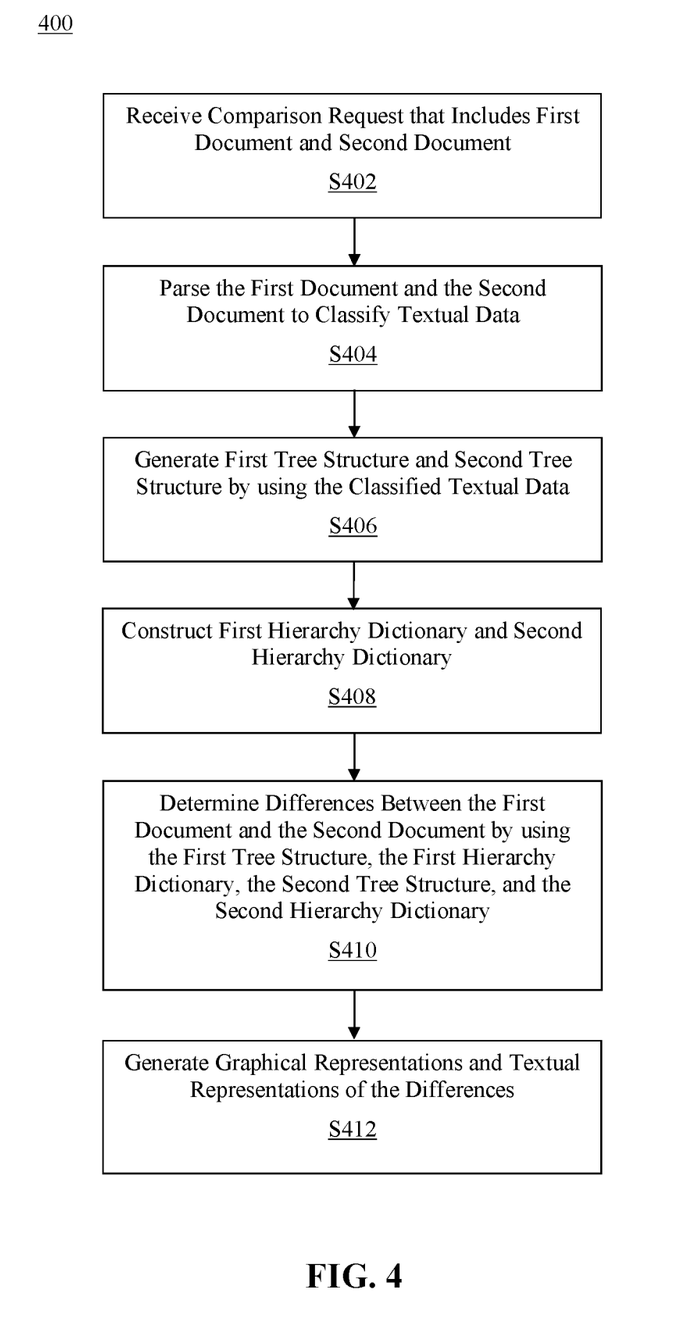
FIG. 4 is a flowchart of an exemplary process for implementing a method for facilitating contextual and structural comparisons of electronic texts via tree-based processing to capture differences and provide structured representations.

In the process 400 of FIG. 4, at step S402, comparison requests may be received via a graphical user interface. Each of the comparison requests may include a first electronic document and a second electronic document. In an exemplary embodiment, the comparison requests may include instructions to compare the first electronic document with the second electronic document. The comparison process may correspond to identification of differences between the first electronic document and the second electronic document. For example, the comparison may be requested to identify changes to the text and/or changes to the structure of an electronic document when compared with another version of the electronic document.

In another exemplary embodiment, the first electronic document and the second electronic document may include textual data in a natural language format such as, for example, an English language. The electronic documents may relate to a digital computer file that includes textual information as well as graphical information. In another exemplary embodiment, the electronic documents may be encoded in a file format such as, for example, a portable document format (PDF) that facilitates storage of data in a computing system. The file format may specify how basic units of information in digital communication such as, for example, bits are used to encode information in a digital storage medium.

In another exemplary embodiment, the graphical user interface may correspond to a user interface that allows users to interact with electronic devices. The users may interact with the electronic devices though graphical icons and audio indicators. In another exemplary embodiment, the graphical user interface may include graphical elements such as, for example, windows, icons, and menus that facilitate the carrying out of commands such as, for example, opening, deleting, and moving files. The users may interact with the graphical elements via input devices such as, for example, a mouse and keyboard.

At step S404, the first electronic document and the second electronic document may be parsed to classify textual data. In an exemplary embodiment, the first electronic document and the second electronic document may be parsed to generate a structured data set. A tool such as, for example, a PDF reader, may be used to extract textual information from both the first electronic document and the second electronic document. The extracted textual information may be combined according to a predetermined format to generate the structured data set. Additionally, the extracted information may include textual trait data such as, for example, font style and font size.

Then, loosely defined rules such as, for example, heuristics may be used to identify structural components such as, for example, a table of contents in the electronic documents. The identified table of contents may also be parsed to extract relevant organizational information such as, for example, section titles, section subtitles, and corresponding page numbers. By using the identified structural components, the relevant organizational information, and the heuristics, attributes may be determined for each textual component of the electronic documents. Some of the attributes may correspond to a binary classification. The attributes may include at least one from among a size attribute, a bold attribute, an italic attribute, an all capitalized attribute, an indented attribute, a title attribute, a header in item-like structure attribute, an item attribute, a dash attribute, a subtitle attribute, a title present in the table of contents attribute, a table attribute, a header in bullet structure attribute, a bullet attribute, and a footnote attribute.

Further, the text components that have the same attributes may be identified and consecutively merged to construct blocks of text units. Consistent with present disclosures, additional post processing may be performed on each of the blocks of text units. Then, labels may be assigned to each of the blocks of text units by classifying each of the blocks into identified titles from the table of contents, the header, the plain text, the item, the table, and/or the footnote. The classification may be based on the attributes that were previously identified for each of the text components. Here, the headers may correspond to any text that contain some header attributes. However, the headers may only correspond to blocks of texts which are not footnotes or tables.

Consistent with present disclosure, heuristics may be used to assign the labels. The heuristics may include a first rule indicating that the header attributes include a larger font size than mode font sizes, a bolded text, an italicized text, an all capitalized text, a title, a subtitle, or a header that takes the form of an item and/or bullet. The heuristics may include a second rule indicating that items are text objects which have a dash, items with no header attributes, and bullets that are without header attributes. The heuristics may include a third rule indicating that plain text objects are those which do not have a header attribute or an item attribute. Similarly, plain text objects are not table of content titles, tables, or footnotes. Labels relating to tables, titles from the table of contents, and footnotes may be assigned based on the presence of the table attributes, the title from table of contents attribute, and the footnote attributes, respectively. Finally, each of the blocks of texts may be stored in a text dictionary where the key is a unique integer, and the value is another text dictionary with keys containing the text as well as the value for all the attributes and the labels.

In another exemplary embodiment, to classify the textual data, the textual data and corresponding textual characteristics such as, for example, font size and font style may be extracted from the first electronic document and from the second electronic document. Consistent with present disclosure, an attribute such as, for example, size and indentation may be determined for each of a plurality of textual components of the textual data based on the corresponding textual characteristic. The attribute may be determined heuristically by using a loosely predefined rule. Then, the plurality of textual components may be consecutively merged into text blocks based on a similarity of the attribute. That is, text components that have the same attributes may be consecutively merged to construct blocks of text units. Finally, a label may be assigned to each of the text blocks based on the corresponding attribute.

At step S406, a first tree structure that corresponds to the first electronic document may be generated by using the classified textual data. Similarly, a second tree structure that corresponds to the second electronic document may also be generated by using the classified textual data.

In an exemplary embodiment, the first tree structure may relate to a first structural hierarchy that represents the first electronic document. The first structural hierarchy may contextually represent the first electronic document and may include a plurality of first linguistic components that are found in the first electronic document. In another exemplary embodiment, the second tree structure may relate to a second structural hierarchy that represents the second electronic document. The second structural hierarchy may contextually represent the second electronic document and may include a plurality of second linguistic components that are found in the second electronic document.

In another exemplary embodiment, nodes may be initialized according to a "n+2" configuration where "n" corresponds to the number of text blocks previously identified in the classification process. The additional two nodes may correspond to a "root" node and a "before table of contents" node. The "before table of contents" node may correspond to a child of the "root" node, whose children are text components that occur before the table of contents. Unique digits may be assigned to all other nodes as a name and/or identifier. The unique digits may correspond to the keys from the text dictionary in the classification process. That is, each of the nodes may correspond to a text block from the classification process.

Then, when a table of content is identified, "table of content" nodes may be initialized according to variable "m" where "m" corresponds to the number of titles and subtitles that are identified in the table of contents. All subtitle nodes may be assigned as a child of a corresponding title node. Next, all nodes which are subtitles included in the table of content may be assigned as children of corresponding title nodes. All remaining nodes which have the label "title from table of contents" may be assigned as children of the root node. When a table of content is identified within the document, the identified page numbers of the table of contents may be used to ensure that all nodes under a certain table of content title are within a page range and that all nodes have a parent as well as children which are also within the same page range.

Further, all nodes which have the label "footnote," "item," "table," or "plain text" may be assigned as children of the next preceding text object which has a higher label ranking. For example, footnote text objects can be assigned as children of text objects with any label besides footnote; item text objects can be assigned as children of text objects with the label item, plain, or header; table text objects can be assigned as children of text objects with the label header or plain; and plain text objects can be assigned as children of text objects with the label header.

Moreover, all nodes which have the label "subtitle" may be assigned as children of corresponding title nodes. Then, in a crucial phase, a structural hierarchy of the electronic documents may be built and used to assign parents to children. The structural hierarchy may be usable to understand what type of header typically precedes each other header in the electronic documents. For this phase, remaining nodes which have no parents, i.e., nodes that correspond to a text object with a header label, may be focused upon.

In another exemplary embodiment, to generate the first tree structure and the second tree structure, nodes may be initialized based on a quantity of the text blocks. Each of the nodes may be linked to each of the text blocks. Then, each of the nodes may be categorized based on a predetermined guideline and the corresponding label. The predetermined guideline may relate to a parent and child classification.

At step S408, a first hierarchy dictionary that corresponds to the first tree structure may be constructed. Similarly, a second hierarchy dictionary that corresponds to the second tree structure may also be constructed. The first hierarchy dictionary and the second hierarchy dictionary may be constructed iteratively as well as simultaneously with the generation of the first tree structure and the second tree structure, respectively. In an exemplary embodiment, consistent with the previously disclosed crucial phase of step S406, four subsequent actions may be initiated after the structural hierarchy, i.e., the tree structure of the electronic documents, is generated.

In the first subsequent action, each of the text attributes may be assigned to an attribute type which encompasses the underlying attribute such as, for example, a "Bold Caps HeaderBullet" attribute type. Consistent with present disclosures, the hierarchy dictionary may be representative of the first text dictionary when related to the first electronic document and the second text dictionary when related to the second electronic document. The hierarchy dictionary may determine which header types can be merged under which other header types based on the next preceding header type of a different type. In the hierarchy dictionary, the key may correspond to the header type, and the value may correspond to a list of eligible parent types. More specifically, for each header, the next preceding header which is not of the same type may be identified. The type that corresponds to the identified next preceding header may be added as an eligible parent for the given header.

In the third subsequent action, parents may be assigned to nodes based on the hierarchy dictionary. More specifically, for each header, the next preceding header of a different type may be identified when the next preceding header is in the list of values for the key in the hierarchy dictionary. Then, the next preceding header may be assigned as a child of the corresponding header. In the fourth subsequent action, iterations through the unparented nodes may be continued to build the hierarchy dictionary. The unparented nodes may be iterated until all nodes have been assigned a parent that follows rules associated with the hierarchy dictionary. Finally, each of the remaining unparented nodes may be assigned as a child of the table of contents "title" node according to a corresponding page range.

In another exemplary embodiment, to construct the first hierarchy dictionary and the second hierarchy dictionary, a header type may be assigned to the attribute that is linked to uncategorized nodes. Then, a hierarchy dictionary that includes merging rules for a plurality of different header types may be built. The hierarchy dictionary may relate to the first hierarchy dictionary and the second hierarchy dictionary. Finally, each of the uncategorized nodes may be iteratively cataloged based on the hierarchy dictionary. The uncategorized nodes may be iteratively cataloged by using the header type. For example, the iterative process may include a process for updating the hierarchy dictionary, and then the tree, and then the hierarchy dictionary, and then the tree.

At step S410, differences between the first electronic document and the second electronic document may be determined. The differences may be determined by using the first tree structure, the first hierarchy dictionary, the second tree structure, and the second hierarchy dictionary. In an exemplary embodiment, the differences may include a type of change between the first electronic document and the second electronic document that corresponds to at least one from among a document structure and a document text. The type of change may include at least one from among a modification change, an addition change, a removal change, an addition with all descendants change, a removal with all descendants change, an order swap change, a parent change, and a modify and reorder change.

In another exemplary embodiment, a breadth first search (BFS) algorithm may be implemented to facilitate determination of the differences between the first electronic document and the second electronic document. The BFS algorithm may be usable to move through the first tree structure and the second tree structure starting at the root, which by default has the same text for both tree structures. The root node for each tree structure may be appended to a corresponding queue. Then, the algorithm may proceed according to the following eight stages.

In a first stage, the last node in each queue may be popped off. These last nodes may be taken to be the "current nodes" for each tree structure. In a second stage, the children at the current node may be extracted for both trees and stored in a list. In a third stage, for each remaining child in the list, matching child nodes may be appended to corresponding queues. The child nodes may be matching when the associated text of a child node in one tree structure has a similarity score over a predetermined threshold such as, for example, a 0.99 threshold with the associated text of another child node in the other tree structure. These matching child nodes may be removed from the list of children.

In a fourth stage, for each remaining child in the list, a tuple of the two nodes as well as a "modify" string may be added to the list of changes as these two nodes are likely to represent a modification. This may be done when there is a similarity score over the lesser threshold. The two nodes are likely to represent the modification when the associated text of one tree structure has a similarity score over a lesser predetermined threshold such as, for example, a 0.8 threshold with one of the children of the node in the other tree structure. These lesser matching child nodes may be appended to corresponding queues and removed from the list of children. For example, the following two strings would be classified as modifications of one another: "The Fund may invest no more than ten percent in bonds and no more than fifteen percent in stock X" and "The Fund may invest no more than ten percent in bonds and no more than six percent in stock X" as the only change is the word "fifteen" to the word "six."

In a fifth stage, the fourth stage may be repeated but instead of checking whether the associated text has a similarity score over the predetermined lesser threshold with one of the children of the node in the other tree structure, a check of whether there are any pairs of children, i.e., one from each tree structure, which have a high percentage of descendants that are the same, e.g., a percentage over 90%. When there is a high percentage of descendants that are the same, the pair of children may be marked as a modification and appended to respective queues. The goal of this check may be to capture instances when a section has been assigned an entirely new name, e.g., "Section 4.2" to "New Section for Fund X", but the section still contains the same information. This process ensures that the situation is captured as a modification of the section name rather than an addition/ removal of the section.

In a sixth stage, for each remaining child of the first tree structure, the node may be appended as a tuple with the "removed" string to the list of changes when the node is a leaf node. Alternatively, the node may be appended as a tuple with the "remove with all its descendants" string to the list of changes when the node is not a leaf node. In a seventh stage, for each remaining child of the second tree, the node may be appended as a tuple with the "add" string to the list of changes when the node is a leaf node. Alternatively, the node may be appended as a tuple with the "add with all its descendants" string to the list of changes when the node is not a leaf node.

From stage one to stage seven, the order in which items are matched may be tracked and logged. In an eighth stage, when a full set of children has been examined, a check may be initiated for the matching order to see whether there is any variation in the matching order. When there is a variation in the matching order, the relevant nodes may be appended as a tuple with the "order swap" string to the list of changes. It may also be possible that this pair of nodes is already in the list of changes as a modification. When this is the case, the associated change string may be adjusted to "modify and reorder."

After iterating through all the nodes in both tree structures and generating the list of changes, post processing may be performed to identify types of changes that are not captured in prior processing steps, such as, for example, changes in the structure of the electronic documents. Post processing may also be performed to categorize identified changes more specifically.

One type of change that may not exactly be captured in prior processing steps would be a change of a parent. This would correspond to some subsection, plain text, item, or any text changing parent that are moved from one section to another, for example. According to the algorithm in prior processing steps, this would currently be represented as an addition and a removal of the same text. Thus, pairs of nodes in the add and remove modification lists may be examined and checked to determine whether corresponding text matches. When the corresponding texts match, a check may be initiated to determine whether a high percentage of corresponding descendants match. When a high percentage of the descendants are the same, the change may be marked as a parent change and removed from the list of addition and removal changes. When all descendants do not match, the BFS algorithm may be initiated starting from the subtrees, which starts from matching nodes. When a high percentage of descendants do not match, no further action may be required as this is an addition/removal change.

For nodes marked as added, removed, or parent changed, a check may be initiated to determine whether the nodes have any associated children. When the nodes are associated with children, the children may be marked as added, removed, or parent changed with all descendants. When the nodes are not associated with children, the nodes may be marked as simply added, removed, or parent changed. This additional marking may be beneficial when considering the extent of the change.

Finally, changes in the text may be summarizes as, for example, "Inserted with all descendants" according to classifications consistent with present disclosures. For changes which are a modification, the actual difference between the strings may be located. For example, at which index in the string the difference actually begins and finishes may be located.

In another exemplary embodiment, to determine the differences, a breadth first search may be iteratively performed through both the first tree structure and the second tree structure. Matching pairs of nodes may be identified from the first tree structure and the second tree structure by using the breadth first search. The matching pairs of nodes may be identified based on a similarity score and a predetermined threshold. The similarity score may be measured as one minus the Levenshtein distance. For example, the matching pairs may satisfy a high threshold. Then, the matching pair of nodes may be appended in a queue.

In another exemplary embodiment, partially matching pairs of nodes may also be identified from the first tree structure and the second tree structure by using the breadth first search. The partially matching pairs of nodes may be identified based on the similarity score and the predetermined threshold. The similarity score may be measured as one minus the Levenshtein distance. For example, the partially matching pairs may only satisfy a lesser threshold. Then, the partially matching pairs may be tagged and appended in the queue.

At step S412, a graphical representation that depicts the differences may be generated. Similarly, a textual representation that summarizes the differences may also be generated. In an exemplary embodiment, the graphical representation may correspond to a graphical element such as, for example, a dashboard that is displayable via the graphical user interface. The graphical elements may include graphical components that are usable to visualize, depict, filter, and adjust the generated differences and associated information. In another exemplary embodiment, the textual representation may correspond to a record that is displayable via the graphical user interface as well as transmittable via a communication channel such as, for example, an email. The record may provide textual information related to the summarized differences.

Figure 5:
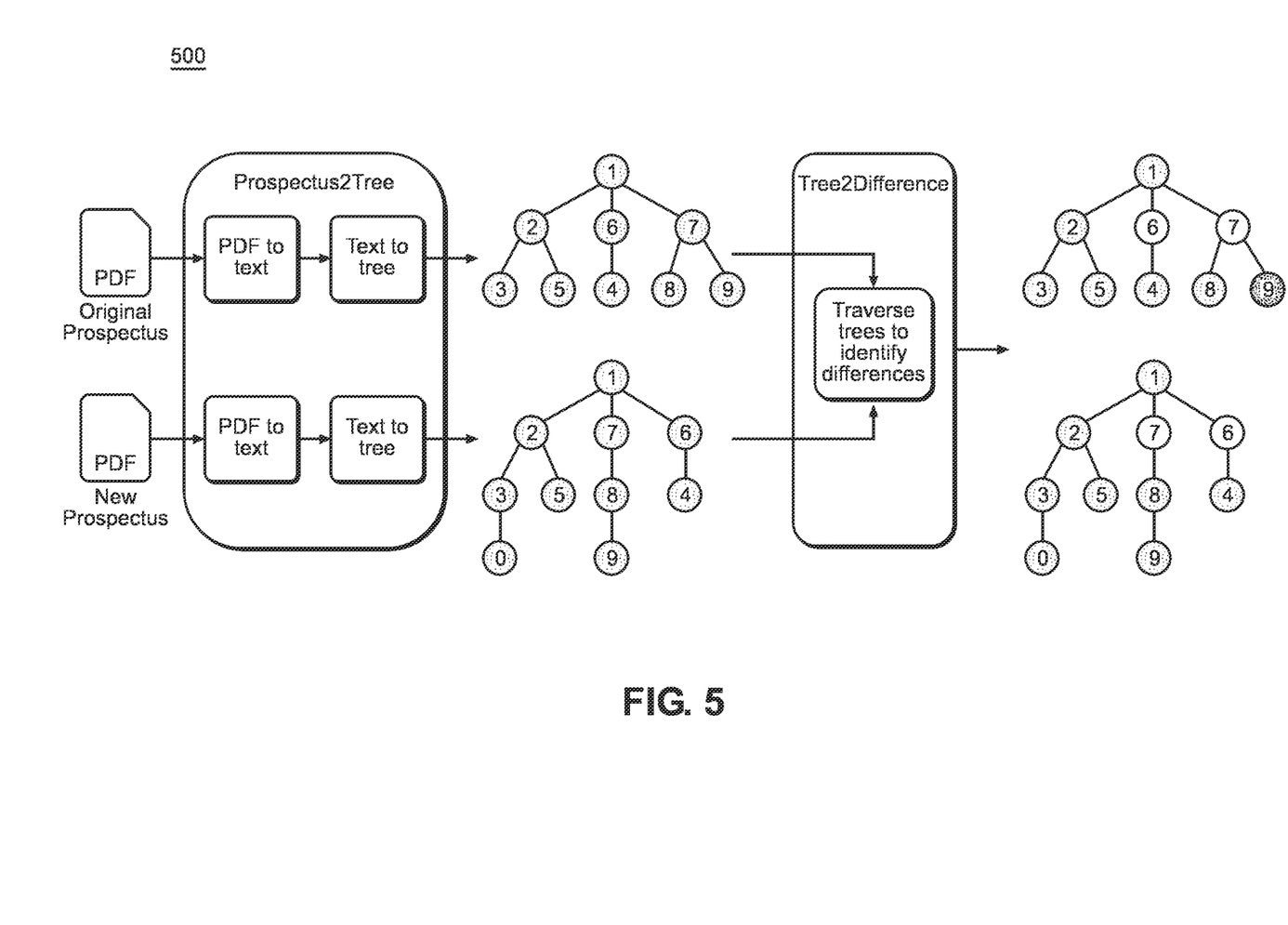
FIG. 5 is an architecture diagram of an exemplary process for implementing a method for facilitating contextual and structural comparisons of electronic texts via tree-based processing to capture differences and provide structured representations.

FIG. 5 is an architecture diagram 500 of an exemplary process for implementing a method for facilitating contextual and structural comparisons of electronic texts via tree-based processing to capture differences and provide structured representations. In FIG. 5, differences between two electronic documents such as, for example, between two PDF documents may be identified. The differences may correspond to changes to the text and/or structure of the electronic documents.

As illustrated in FIG. 5, consistent with present disclosures, the disclosed approach for identifying the differences may be separated into two main algorithms. The first algorithm relates to parsing of the electronic documents to generate corresponding tree structures. The second algorithm relates to computing the differences by using the tree structures.

In the first algorithm, text and related text attributes such as, for example, font and font size may be extracted from both PDF documents. Loosely defined rules such as, for example, heuristics may be used to assign additional text attributes for each text chunk such as, for example, a text item or a text title. Consecutive text with same text attributes may be grouped to form text blocks with shared attributes. Then, the text blocks may be classified into a set of labels based on corresponding attributes. Finally, tree structures may be constructed by leveraging structural hierarchy of text block labels and iteratively updated structural hierarchy. For example, the structural hierarchy may be iteratively updated and used to build the tree, which in turn helps update the hierarchy. In the second algorithm, both tree structures may be traversed in a breadth first search to identify differences.

Accordingly, with this technology, an optimized process for facilitating contextual and structural comparisons of electronic texts via tree-based processing to capture differences and provide structured representations is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for facilitating electronic textual representation and comparison, the method being implemented by at least one processor, the method comprising:

receiving, by the at least one processor via a graphical user interface, at least one comparison request, each of the at least one comparison request including a first electronic document and a second electronic document, wherein the first electronic document and the second electronic document are digital computer files, and wherein the receiving is initiated by a command obtained by an interaction with at least one from among a graphical icon and an audio indicator of the graphical user interface;

parsing, by the at least one processor, the first electronic document and the second electronic document to classify textual data, wherein the classifying of textual data includes:

extracting, by the at least one processor, the textual data and at least one corresponding textual characteristic from the first electronic document and from the second electronic document;

determining, by the at least one processor using a predefined rule, a respective attribute for each of a plurality of textual components of the textual data based on the corresponding textual characteristic;

consecutively merging, by the at least one processor, the plurality of textual components into at least one text block based on a similarity of corresponding respective attributes;

assigning, by the at least one processor, a respective integer to each of the at least one text block based on the corresponding attribute; and storing, by the at least one processor, each block of the at least one text block and the corresponding respective integer in a text dictionary, wherein the corresponding respective integer comprises a key for identifying each of the at least one text block;

automatically generating, by the at least one processor using the classified textual data, a first tree structure that corresponds to the first electronic document and a second tree structure that corresponds to the second electronic document, wherein the first tree structure and the second tree structure are generated using a same organizational hierarchy to facilitate a comparing of the first electronic document with the second electronic document, and wherein the organizational hierarchy is based on the classifying of textual data operations;

constructing, by the at least one processor, a first hierarchy dictionary that corresponds to the first tree structure and a second hierarchy dictionary that corresponds to the second tree structure;

determining, by the at least one processor via a breadth first search algorithm, at least one difference between the first electronic document and the second electronic document by using the first tree structure and the second tree structure, wherein the breadth first search algorithm determines the at least one difference by:

appending a respective root node from each of the first tree structure and the second tree structure to a corresponding respective queue;

transmitting a last node in each respective queue to a current node of a respective corresponding tree structure from among the first tree structure and the second tree structure;

extracting at least one first child node from the current node of the first tree structure and extracting at least one second child node from the current node of the second tree structure;

storing the at least one first child node and the at least one second child node in a list;

calculating a respective similarity score between each respective at least one first child node and each respective at least one second child node, wherein the respective similarity score relates to how closely associated text of each respective at least one first child node matches associated text of each respective at least one second child node;

identifying pairs of child nodes, whose similarity score exceeds a predetermined threshold, as matching;

removing the matching pairs of child nodes from the list;

identifying remaining child nodes from the list that are associated with the first tree structure as being removed; and identifying remaining child nodes from the list that are associated with the second tree structure as being added; and generating, by the at least one processor, at least one graphical representation that depicts the at least one difference and at least one textual representation that summarizes the at least one difference.

2. The method of claim 1, wherein the at least one comparison request includes instructions to compare the first electronic document with the second electronic document, the first electronic document and the second electronic document including data in a natural language format.

3. The method of claim 1, wherein the first tree structure relates to a first structural hierarchy that represents the first electronic document, the first structural hierarchy including a plurality of first linguistic components; and wherein the second tree structure relates to a second structural hierarchy that represents the second electronic document, the second structural hierarchy including a plurality of second linguistic components.

4. The method of claim 1, wherein the at least one difference includes a type of change that corresponds to at least one from among a document structure and a document text, the type of change including at least one from among a modification change, an addition change, a removal change, an addition with all descendants change, a removal with all descendants change, an order swap change, a parent change, and a modify and reorder change.

5. The method of claim 1, wherein generating the first tree structure and the second tree structure further comprises:

initializing, by the at least one processor, at least one tree node based on a quantity of the at least one text block, wherein the at least one tree node includes the at least one first child node and the at least one second child node;

linking, by the at least one processor, each of the at least one tree node to each of the at least one text block; and categorizing, by the at least one processor, each of the at least one tree node based on a predetermined guideline and the corresponding respective integer, the predetermined guideline relating to a parent and child classification.

6. The method of claim 5, wherein constructing the first hierarchy dictionary and the second hierarchy dictionary further comprises:

assigning, by the at least one processor, a header type to a corresponding attribute from the respective attributes that is linked to at least one uncategorized node;

building, by the at least one processor, the text dictionary, wherein the text dictionary includes merging rules for a plurality of different header types, the text dictionary relating to the first hierarchy dictionary and the second hierarchy dictionary; and iteratively cataloging, by the at least one processor using the header type, each of the at least one uncategorized node based on the text dictionary.

7. The method of claim 6, further comprising:

identifying, by the at least one processor using the breadth first search algorithm, at least one partially matching pair of nodes from the first tree structure and the second tree structure based on the similarity score and the predetermined threshold;

tagging, by the at least one processor, the at least one partially matching pair; and appending, by the at least one processor, the at least one partially matching pair together with the tag in the corresponding respective queue.

8. A computing device configured to implement an execution of a method for facilitating electronic textual representation and comparison, the computing device comprising:
a processor;
a memory; and
a communication interface coupled to each of the processor and the memory,
wherein the processor is configured to:
  receive, via a graphical user interface, at least one comparison request, each of the at least one comparison request including a first electronic document and a second electronic document,
    wherein the first electronic document and the second electronic document are digital computer files, and
    wherein the receiving is initiated by a command obtained by an interaction with at least one from among a graphical icon and an audio indicator of the graphical user interface;
  parse the first electronic document and the second electronic document to classify textual data,
    wherein the classifying of textual data includes:
      extracting the textual data and at least one corresponding textual characteristic from the first electronic document and from the second electronic document;
      determining, using a predefined rule, a respective attribute for each of a plurality of textual components of the textual data based on the corresponding textual characteristic;
      consecutively merging the plurality of textual components into at least one text block based on a similarity of corresponding respective attributes;
      assigning a respective integer to each of the at least one text block based on the corresponding attribute; and
      storing each block of the at least one text block and the corresponding respective integer in a text dictionary, wherein the corresponding respective integer comprises a key for identifying each of the at least one text block;
  automatically generate, by using the classified textual data, a first tree structure that corresponds to the first electronic document and a second tree structure that corresponds to the second electronic document, wherein the first tree structure and the second tree structure are generated using a same organizational hierarchy to facilitate a comparing of the first electronic document with the second electronic document, and wherein the organizational hierarchy is based on the classifying of textual data operations;
  construct a first hierarchy dictionary that corresponds to the first tree structure and a second hierarchy dictionary that corresponds to the second tree structure;
  determine, via a breadth first search algorithm, at least one difference between the first electronic document and the second electronic document by using the first tree structure and the second tree structure, wherein the breadth first search algorithm determines the at least one difference by:
    appending a respective root node from each of the first tree structure and the second tree structure to a corresponding respective queue;
    transmitting a last node in each respective queue to a current node of a respective corresponding tree structure from among the first tree structure and the second tree structure;
    extracting at least one first child node from the current node of the first tree structure and extracting at least one second child node from the current node of the second tree structure;
    storing the at least one first child node and the at least one second child node in a list;
    calculating a respective similarity score between each respective at least one first child node and each respective at least one second child node, wherein the respective similarity score relates to how closely associated text of each respective at least one first child node matches associated text of each respective at least one second child node;
    identifying pairs of child nodes, whose similarity score exceeds a predetermined threshold, as matching;
    removing the matching pairs of child nodes from the list;
    identifying remaining child nodes from the list that are associated with the first tree structure as being removed; and
    identifying remaining child nodes from the list that are associated with the second tree structure as being added; and
  generate at least one graphical representation that depicts the at least one difference and at least one textual representation that summarizes the at least one difference.

9. The computing device of claim 8, wherein the at least one comparison request includes instructions to compare the first electronic document with the second electronic document, the first electronic document and the second electronic document including data in a natural language format.

10. The computing device of claim 8, wherein the first tree structure relates to a first structural hierarchy that represents the first electronic document, the first structural hierarchy including a plurality of first linguistic components; and wherein the second tree structure relates to a second structural hierarchy that represents the second electronic document, the second structural hierarchy including a plurality of second linguistic components.

11. The computing device of claim 8, wherein the at least one difference includes a type of change that corresponds to at least one from among a document structure and a document text, the type of change including at least one from among a modification change, an addition change, a removal change, an addition with all descendants change, a removal with all descendants change, an order swap change, a parent change, and a modify and reorder change.

12. The computing device of claim 8, wherein, to generate the first tree structure and the second tree structure, the processor is further configured to:
   initialize at least one tree node based on a quantity of the at least one text block, wherein the at least one tree node includes the at least one first child node and the at least one second child node;
   link each of the at least one tree node to each of the at least one text block; and
   categorize each of the at least one tree node based on a predetermined guideline and the corresponding respective integer, the predetermined guideline relating to a parent and child classification.

13. The computing device of claim 12, wherein, to construct the first hierarchy dictionary and the second hierarchy dictionary, the processor is further configured to:
   assign a header type to a corresponding attribute from the respective attributes that is linked to at least one uncategorized node;
   build the text dictionary, wherein the text dictionary includes merging rules for a plurality of different header types, the text dictionary relating to the first hierarchy dictionary and the second hierarchy dictionary; and
   iteratively catalog, by using the header type, each of the at least one uncategorized node based on the text dictionary.

14. The computing device of claim 13, wherein the processor is further configured to:
   identify, by using the breadth first search algorithm, at least one partially matching pair of nodes from the first tree structure and the second tree structure based on the similarity score and the predetermined threshold;
   tag the at least one partially matching pair; and
   append the at least one partially matching pair together with the tag in the corresponding respective queue.

15. A non-transitory computer readable storage medium storing instructions for facilitating electronic textual representation and comparison, the storage medium comprising executable code which, when executed by a processor, causes the processor to:
   receive, via a graphical user interface, at least one comparison request, each of the at least one comparison request including a first electronic document and a second electronic document,
   wherein the first electronic document and the second electronic document are digital computer files, and
   wherein the receiving is initiated by a command obtained by an interaction with at least one from among a graphical icon and an audio indicator of the graphical user interface;
   parse the first electronic document and the second electronic document to classify textual data,
   wherein the classifying of textual data includes:
      extracting the textual data and at least one corresponding textual characteristic from the first electronic document and from the second electronic document;
      determining, using a predefined rule, a respective attribute for each of a plurality of textual components of the textual data based on the corresponding textual characteristic;
      consecutively merging the plurality of textual components into at least one text block based on a similarity of corresponding respective attributes;
      assigning a respective integer to each of the at least one text block based on the corresponding attribute; and
      storing each block of the at least one text block and the corresponding respective integer in a text dictionary, wherein the corresponding respective integer comprises a key for identifying each of the at least one text block;
   automatically generate, by using the classified textual data, a first tree structure that corresponds to the first electronic document and a second tree structure that corresponds to the second electronic document, wherein the first tree structure and the second tree structure are generated using a same organizational hierarchy to facilitate a comparing of the first electronic document with the second electronic document, and wherein the organizational hierarchy is based on the classifying of textual data operations;
   construct a first hierarchy dictionary that corresponds to the first tree structure and a second hierarchy dictionary that corresponds to the second tree structure;
   determine, via a breadth first search algorithm, at least one difference between the first electronic document and the second electronic document by using the first tree structure and the second tree structure, wherein the breadth first search algorithm determines the at least one difference by:
      appending a respective root node from each of the first tree structure and the second tree structure to a corresponding respective queue;
      transmitting a last node in each respective queue to a current node of a respective corresponding tree structure from among the first tree structure and the second tree structure;
      extracting at least one first child node from the current node of the first tree structure and extracting at least one second child node from the current node of the second tree structure;
      storing the at least one first child node and the at least one second child node in a list;
      calculating a respective similarity score between each respective at least one first child node and each respective at least one second child node, wherein the respective similarity score relates to how closely associated text of each respective at least one first child node matches associated text of each respective at least one second child node;
      identifying pairs of child nodes, whose similarity score exceeds a predetermined threshold, as matching;
      removing the matching pairs of child nodes from the list;
      identifying remaining child nodes from the list that are associated with the first tree structure as being removed; and
      identifying remaining child nodes from the list that are associated with the second tree structure as being added; and
   generate at least one graphical representation that depicts the at least one difference and at least one textual representation that summarizes the at least one difference.

16. The storage medium of claim 15, wherein the at least one comparison request includes instructions to compare the first electronic document with the second electronic document, the first electronic document and the second electronic document including data in a natural language format.

* * * * *